United States Patent
Wang et al.

(10) Patent No.: US 10,815,142 B2
(45) Date of Patent: Oct. 27, 2020

(54) GRADIENT FINING TANK FOR REFINING FOAMY MOLTEN GLASS AND A METHOD OF USING THE SAME

(71) Applicant: Owens-Brockway Glass Container Inc., Perrysburg, OH (US)

(72) Inventors: Zhongming Wang, Ypsilanti, MI (US); Udaya K Vempati, Perrysburg, OH (US); Ya-Cheng Lin, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 203 days.

(21) Appl. No.: 15/922,536

(22) Filed: Mar. 15, 2018

(65) Prior Publication Data
US 2019/0284076 A1    Sep. 19, 2019

(51) Int. Cl.
| | | |
|---|---|---|
| *C03B 5/20* | (2006.01) | |
| *C03B 5/225* | (2006.01) | |
| *C03B 5/26* | (2006.01) | |
| *C03B 5/04* | (2006.01) | |
| *C03B 5/03* | (2006.01) | |
| *C03B 5/42* | (2006.01) | |

(Continued)

(52) U.S. Cl.
CPC ............. *C03B 5/207* (2013.01); *C03B 5/03* (2013.01); *C03B 5/04* (2013.01); *C03B 5/205* (2013.01); *C03B 5/225* (2013.01); *C03B 5/262* (2013.01); *C03B 5/193* (2013.01); *C03B 5/42* (2013.01); *C03B 2211/20* (2013.01); *C03B 2211/23* (2013.01); *C03C 3/087* (2013.01)

(58) Field of Classification Search
CPC ............................ C03B 5/225; C03B 5/2356
See application file for complete search history.

(56) References Cited

U.S. PATENT DOCUMENTS

| | | |
|---|---|---|
| 2,274,643 A | 3/1942 | Adams |
| 2,773,111 A | 12/1956 | Arbeit et al. |

(Continued)

FOREIGN PATENT DOCUMENTS

| | | |
|---|---|---|
| DE | 102005033330 B3 | 8/2006 |
| EP | 0086859 A1 | 8/1983 |

(Continued)

OTHER PUBLICATIONS

International Search Report and Written Opinion, Int. Serial No. PCT/US2019/021787, Int. Filing Date: Mar. 12, 2019, Applicant: Owens-Brockway Glass Container Inc., dated Jun. 17, 2019.

*Primary Examiner* — Erin Snelting

(57) ABSTRACT

A gradient fining tank and a method of operating the tank to refine foamy molten glass is disclosed. The gradient fining tank includes a floor, a roof, and two laterally-spaced sidewalls that at least partially define an interior chamber of the tank. The floor of the tank is profiled to provide the tank with an extended shallow portion that defines an inlet to the interior chamber and a deep holding portion that defines an outlet from the interior chamber. An entry section of the floor provides the extended shallow portion of the tank and a transition section and exit section of the floor provide the deep holding portion. A depth of the interior chamber at an outlet end of the deep holding portion is greater than a depth of the interior chamber at the outlet end of the extended shallow portion.

18 Claims, 3 Drawing Sheets

(51) Int. Cl.
*C03B 5/193* (2006.01)
*C03C 3/087* (2006.01)

(56) References Cited

U.S. PATENT DOCUMENTS

| | | |
|---|---|---|
| 3,321,300 A | 5/1967 | Worner |
| 4,798,616 A | 1/1989 | Knavish et al. |
| 6,154,481 A * | 11/2000 | Sorg .......................... C03B 5/04 |
| | | 373/30 |
| 8,402,787 B2 | 3/2013 | Purnode et al. |
| 8,707,739 B2 * | 4/2014 | Huber ..................... C03B 5/202 |
| | | 65/134.9 |
| 8,806,899 B2 | 8/2014 | Lindig et al. |
| 9,021,838 B2 * | 5/2015 | Charbonneau .......... C03B 5/202 |
| | | 65/347 |
| 9,227,865 B2 | 1/2016 | Shock et al. |
| 9,249,042 B2 | 2/2016 | Wang et al. |
| 9,533,905 B2 * | 1/2017 | Charbonneau ............ C03B 5/04 |
| 2002/0162358 A1 * | 11/2002 | Jeanvoine ............. C03B 5/2356 |
| | | 65/134.5 |
| 2009/0176639 A1 | 7/2009 | Jacques et al. |
| 2010/0175427 A1 | 7/2010 | Sorg |
| 2013/0279532 A1 | 10/2013 | Ohmstede et al. |
| 2014/0090423 A1 | 4/2014 | Charbonneau et al. |
| 2016/0075585 A1 | 3/2016 | Shock et al. |
| 2016/0122221 A1 | 5/2016 | Huber et al. |

FOREIGN PATENT DOCUMENTS

| | | |
|---|---|---|
| FR | 1141666 A | 9/1957 |
| WO | 2015134315 A1 | 2/2015 |

\* cited by examiner

GRADIENT FINING TANK FOR REFINING FOAMY MOLTEN GLASS AND A METHOD OF USING THE SAME

The present disclosure is directed to a gradient fining tank configured to refine foamy molten glass and, more specifically, to a gradient fining tank that includes an extended shallow portion and a deep holding portion downstream of the extended shallow portion in a flow direction through interior tank chamber.

BACKGROUND

Glass is a rigid amorphous solid that has numerous applications. Soda-lime-silica glass, for example, is used extensively to manufacture a variety of hollow glass articles including containers such as bottles and jars. Soda-lime-silica glass comprises a disordered and spatially crosslinked ternary oxide network of $Na_2O$—$CaO$—$SiO_2$. The silica component ($SiO_2$) is the largest oxide by weight and constitutes the primary network forming material of soda-lime-glass. The $Na_2O$ component functions as a fluxing agent that reduces the melting, softening, and glass transition temperatures of the glass, as compared to pure silica glass, and the CaO component functions as a stabilizer that improves certain physical and chemical properties of the glass including its hardness and chemical resistance. The inclusion of $Na_2O$ and CaO in the chemistry of soda-lime-silica glass renders the commercial manufacture of glass containers more practical and less energy intensive while still yielding acceptable glass properties. Soda-lime-silica glass, in general and based on the total weight of the glass, includes 60 wt % to 80 wt % $SiO_2$, 8 wt % to 18 wt % $Na_2O$, and 5 wt % to 15 wt % CaO.

In addition to $SiO_2$, $Na_2O$, and CaO, soda-lime-silica glass may, if desired, include other oxide and non-oxide materials that act as network formers, network modifiers, colorants, decolorants, redox agents, or other agents that affect the properties the final glass. Some examples of these additional materials include aluminum oxide ($Al_2O_3$), magnesium oxide (MgO), potassium oxide ($K_2O$), carbon, nitrates, fluorines, chlorines, and/or elemental or oxide forms of one or more of iron, arsenic, antimony, selenium, chromium, barium, manganese, cobalt, nickel, sulfur, vanadium, titanium, lead, copper, niobium, molybdenum, lithium, silver, strontium, cadmium, indium, tin, gold, cerium, praseodymium, neodymium, europium, gadolinium, erbium, and uranium. Aluminum oxide is one of the more commonly included materials—typically present in an amount up to 2 wt % based on the total weight of the glass—because of its ability to improve the chemical durability of the glass and to reduce the likelihood of devitrification. Regardless of what other oxide and/or non-oxide materials are present in the soda-lime-glass besides $SiO_2$, $Na_2O$, and CaO, the sum total of those additional materials is preferably 10 wt % or less, or more narrowly 5 wt % or less, based on the total weight of the soda-lime-silica glass.

Soda-lime-silica glass for containers and other end-uses has long been produced in a continuous melting furnace in which a glass feedstock is fed onto a large molten glass bath-on the order of hundreds of metric tons—of generally constant level contained in a melting chamber of a continuous melting furnace. The molten glass bath is maintained at a temperature of about 1450° C. or greater so that the added glass feedstock can melt, react, and progress through several intermediate melt phases before becoming chemically integrated into the molten glass bath as the bath moves through the melting chamber of the furnace towards a refining chamber located on the opposite side of a submerged throat. In the refining chamber, bubbles and other gaseous inclusions are removed from the glass to yield chemically homogenized and refined molten glass having the correct chemistry as needed for further processing. For instance, in the manufacture of glass containers, the refined molten glass is transported from the refining chamber, through a forehearth, and into to a glass feeder where precise gobs of molten glass are sheared and dropped into a gob delivery system. The gobs of glass are delivered to a blank mold and formed into a parison or a partially-shaped hollow container. The parison is then transferred to a blow mold and enlarged into the final container.

The heat needed to maintain the molten glass bath within the melting chamber has conventionally been supplied by burners that combust a fuel and oxidant mixture within an open combustion zone located above the molten glass bath. The burners are located in burner ports on opposite sidewalls of the refractory superstructure that partially defines the combustion zone (cross fired furnace) or in a back wall of the refractory superstructure (end port fired furnace) and typically combust a mixture of natural gas and air or pure oxygen (oxy fuel). To improve the energy efficiency of the burners if air is employed as the oxidant, the flue gases created by the combustion process are used to preheat the air fed to the burners through recuperative or regenerative heat-recovery techniques. Electrical boosting may also be used to introduce additional heat into the molten glass bath by passing an electric current through the bath between submerged electrodes in an attempt to enhance the temperature uniformity within the bath and improve furnace output.

The operation of conventional continuous melting furnaces for glass production is very energy intensive given the large quantity of molten glass held within the melting chamber of the furnace and the relatively long residence times, usually ranging from 18 hours to 24 hours. Continuous melting furnaces are operated indefinitely as long as they are structurally and functionally operational in order to achieve a level of energy efficiency that supports the economics of glass product manufacturing and also to preserve the structural integrity of the furnace structure. Shutting down a conventional continuous melting furnace and emptying the molten glass bath is not economically practical, even when the production of glass end-products is halted for an extended period of time, and risks cracking the refractory materials used to construct the furnace due to thermal shock. Rather, during a production stoppage, the addition of glass feedstock into the furnace is suspended, the removal of molten glass from the furnace is halted, and the molten glass bath contained in the melting chamber is sustained in its current state through the requisite addition of heat from the burners. Steady-state operation of the furnace may then be resumed by removing refined molten glass as needed to meet production needs and feeding glass feedstock into the molten glass bath to offset the amount of refined molten glass being removed.

Submerged combustion (SC) melting is a melting technology that has recently become a potentially viable alternative to the glass feedstock melting process used in a conventional continuous melting furnace. Contrary to conventional melting practices, SC melting involves firing the fuel and oxidant mixture directly into and under the surface of a molten glass bath contained in a melter, typically though submerged oxy-fuel burners mounted in the floor or sidewalls of the melter. The fuel and oxidant mixture autoignites and the resultant combustion gasses cause vigorous stirring as they jet through the molten glass bath. This creates intense heat transfer and rapid particle dissolution throughout the bath and contributes to a reduction in the residence time of molten glass within the melter compared to a melting chamber of a conventional melting furnace. Indeed, in a SC melter, the residence time of molten glass may be as little as three to four hours. To that end, the SC melter can be smaller than the melting chamber of a continuous melting furnace and still provide a comparable output of molten glass. The smaller size of the SC melter, and the fact that it can be externally cooled, enables it to be shut down and emptied, and then restarted, quickly and efficiently when necessitated by production schedules or other considerations.

While SC technology can melt the glass feedstock to produce chemically and thermally homogenized molten glass relatively quickly, the molten glass bath contained within the SC melter has a tendency to be foamy as a result of the strong turbulence generated in the bath by operation of the submerged burners. In particular, the forced delivery of combustion gasses into the molten glass bath contributes to widespread gas bubbles, seeds, and/or dissolved gases within the molten glass bath. Existing fining chambers utilized in connection with conventional continuous melting furnaces may not be well-adapted for refining the low-density foamy molten glass removed from the SC melter in a time-efficient manner. One particular challenge that is unique to SC melting technology is that a stable layer of bubbles tends to form at the upper surface of the molten glass, which, in turn, blocks the further ascension and escape of bubbles contained in the glass while also inhibiting heat transfer into the underlying portion of the glass. A fining tank that is designed to refine foamy molten glass, particularly in a plant setting, would help support the successful implementation of SC melting technology in the overall manufacture of glass products including, most notably, the manufacture of glass containers.

SUMMARY OF THE DISCLOSURE

The present disclosure describes a gradient fining tank and a method of using the gradient fining tank to refine foamy molten glass received from, for example, a glass melting furnace such as an upstream submerged combustion melter. The gradient fining tank includes a floor, a roof, and two laterally-spaced sidewalls that at least partially define an interior chamber of the tank. The floor of the tank is profiled to provide the tank with an extended shallow portion that defines an inlet to the interior chamber and a deep holding portion that defines an outlet from the interior chamber. Relative to a flow direction though the tank interior chamber, the floor includes an entry section, a transition section, and an exit section. The transition section and the exit section constitute the portion of the floor included in the deep holding portion, which is disposed downstream from the extended shallow portion, and a depth of the interior chamber at the outlet end of the deep holding portion is greater than a depth of the interior chamber at the outlet end of the extended shallow portion. Additionally, the transition section of the floor has a flow surface that slopes downwardly and outwardly from a flow surface of the entry section of the floor in the extended shallow portion of the tank.

The present disclosure embodies a number of aspects that can be implemented separately from or in combination with each other to provide a gradient fining tank particularly adapted to refine foamy molten glass received from a submerged combustion melter. According to one embodiment of the present disclosure, a method of refining foamy molten glass includes several steps. In one step, foamy molten glass is introduced into an interior chamber of a gradient fining tank defined at least in part by a roof, a floor, and a pair of laterally-spaced sidewalls that connect the roof and the floor. The foamy molten glass is introduced into the interior chamber through an inlet of the gradient fining tank that communicates with an upstream portion of the interior chamber defined by an extended shallow portion of the tank. Upon introduction into the upstream portion of the interior chamber, the foamy molten glass intermixes with a molten glass bath that is maintained within the interior chamber of the gradient fining tank.

In another step, the molten glass bath is directed to flow along the extended shallow portion of the gradient fining tank from an inlet end of the extended shallow portion to an outlet end of the extended shallow portion. The extended shallow portion includes an entry section of the floor, and the molten glass bath separates into a higher-density phase and a lower-density phase that rests on top of the higher-density phase within the extended shallow portion of the gradient fining tank. In yet another step, the molten glass bath is directed to flow into a downstream portion of the interior chamber defined by a deep holding portion of the gradient fining tank. The deep holding portion has an inlet end, which communicates with the outlet end of the extended shallow portion, and an outlet end. The deep holding portion further includes a transition section of the floor that extends downwardly and outwardly from the entry section of the floor of the extended shallow portion to an exit section of the floor. A depth of the downstream portion of the interior chamber at the outlet end of the deep holding portion is greater than a depth of the upstream portion of the interior chamber at the outlet end of the extended shallow portion.

In another step, the molten glass bath is directed to flow along the deep holding portion from the inlet end of the deep holding portion to the outlet end of the deep holding portion. The higher-density phase of the molten glass bath sinks and collects as refined molten glass within the downstream portion of the interior chamber above the exit section of the floor at the outlet end of the deep holding portion of the tank. And, in still another step, refined molten glass is removed from the interior chamber of the gradient fining tank through an outlet of the gradient fining tank that communicates with the downstream portion of the interior chamber. The outlet of the gradient fining tank is downwardly displaced from the inlet of the gradient fining tank.

According to another aspect of the present disclosure, a method of refining foamy molten glass includes several steps. In one step, a gradient fining tank is provided that includes a roof, a floor, and a pair of sidewalls that connect the roof and floor. The roof, floor, and sidewalls at least partially define an interior chamber that holds a molten glass bath. The gradient fining tank has an extended shallow portion that defines an upstream portion of the interior chamber and a deep holding portion that defines a downstream portion of the interior chamber. Moreover, the extended shallow portion of the tank includes an entry section of the floor and the downstream portion of the tank includes a transition section of the floor that extends downwardly and outwardly from the entry section of the floor to an exit section of the floor such that a depth of the downstream portion of the interior chamber at an outlet end of the deep holding portion is greater than a depth of the upstream portion of the interior chamber at an outlet end of the extended shallow portion.

In another step, foamy molten glass is introduced into the upstream portion of the interior chamber through an inlet of the gradient fining tank. The foamy molten glass intermixes with and is subsumed by the molten glass bath that is maintained within the interior chamber of the gradient fining tank. In yet another step, the molten glass bath is directed to flow along the extended shallow portion and into and along the deep holding portion in a flow direction through the interior chamber. The molten glass bath has a zone of refined molten glass that collects adjacent to the outlet end of the deep holding portion above the exit section of the floor of the gradient fining tank. In still another step, refined molten glass is removed from the downstream portion of the interior chamber through an outlet of the gradient fining tank. The outlet of the gradient fining tank is downwardly displaced from the inlet of the gradient fining tank and is open to a flow surface of the exit section of the floor.

According to yet another aspect of the present disclosure, a gradient fining tank includes a roof, a floor, and a pair of sidewalls that connect the roof and floor. The roof, floor, and sidewalls at least partially define an interior chamber for holding a molten glass bath. Moreover, the floor has an entry section that includes a flow surface, an exit section that includes a flow surface, and a transition section that extends downwardly and outwardly from the entry section of the floor to the exit section of the floor. The transition section of the floor has a flow surface that slopes downwardly and outwardly from the flow surface of the entry section. The gradient fining tank also includes an inlet that communicates with an upstream portion of the interior chamber defined by an extended shallow portion of the gradient fining tank that includes the entry section of the floor. The extended shallow portion of the gradient fining tank has an inlet end and an outlet end. Additionally, the gradient fining tank includes an outlet that communicates with a downstream portion of the interior chamber defined by a deep holding portion of the gradient fining tank that includes the transition section and the exit section of the floor. The deep holding portion of the gradient fining tank has an inlet end that communicates with the outlet end of the extended shallow portion and an outlet end, and a depth of the downstream portion of the interior chamber at the outlet end of the deep holding portion is greater than a depth of the upstream portion of the interior chamber at the outlet end of the extended shallow portion. The outlet of the gradient fining tank is downwardly displaced from the inlet of the gradient fining tank.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

The present disclosure is directed to a gradient fining tank that refines foamy molten glass. The gradient fining tank is constructed specifically to refine foamy molten glass that is produced in, and delivered from, an upstream submerged combustion melter in a practical manner. The gradient fining tank relies primarily on gravity to collect refined molten glass that has a satisfactory low concentration of bubbles, seeds, and other inclusions as needed to facilitate downstream processing into, for example, a glass container. As will be further described below, a floor of the gradient fining tank is profiled to provide the tank with an extended shallow portion and a deep holding portion that allows a bath of molten glass maintained within an interior chamber of the tank to naturally separate by density with the highest density glass accumulating at the bottom of the deep holding portion near an outlet from interior chamber as refined molten glass. The refining capability of the tank may be augmented with one or more skimmers and/or one or more heat supply devices in an effort to speed up the refining process and possibly allow for a smaller tank structure. Foamy molten glass may be introduced into the gradient fining tank and ultimately refined with or without the use of chemical fining agents.

Figure 1:
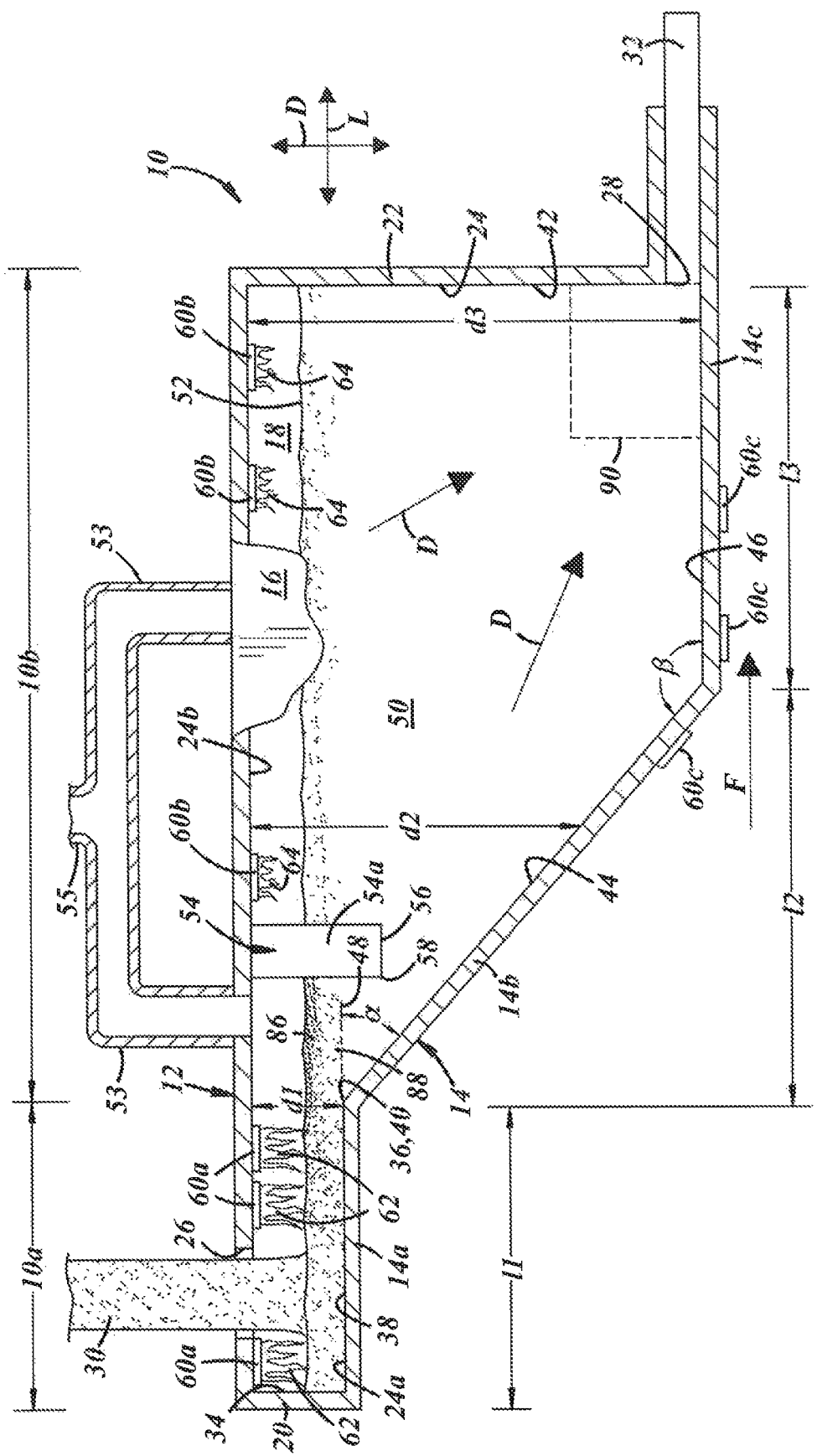
FIG. 1 is an elevated partial cross-sectional view of a gradient fining tank according to one embodiment of the present disclosure.

Referring now to FIG. 1, a first embodiment of the disclosed gradient fining tank is identified by reference numeral 10. The gradient fining tank 10 includes a roof 12, a floor 14, two laterally-spaced sidewalls 16, 18 that connect the roof 12 and the floor 14, a front end wall 20, and a rear end wall 22. These wall structures 12, 14, 16, 18, 20, 22 define an interior chamber 24 of the tank 10. The interior chamber 24 and portions thereof are measurable using a coordinate system that includes three orthogonal axes-notably, a length dimension L, a width dimension W, and a depth dimension D. The length dimension L is a longitudinal dimension that extends along a flow direction F through the interior chamber 24, the width dimension W is a lateral dimension that extends between the laterally-spaced sidewalls 16, 18 transverse to the length dimension L, and the depth dimension D is a vertical dimension that extends between the roof 12 and the floor 14 orthogonal to the plane of the length and width dimensions L, W. The gradient fining tank 10 also includes an inlet 26 to the interior chamber 24 and an outlet 28 from the interior chamber 24. A flow 30 of foamy molten glass is introduced into the interior chamber 24 through the inlet 26 and a flow 32 of refined molten glass is discharged from the interior chamber 24 through the outlet 28.

The floor 14 of the gradient fining tank 10 is profiled to provide the tank 10 with an extended shallow portion 10a and a deep holding portion 10b positioned downstream of the extended shallow portion 10a relative to the flow direction F through the interior chamber 24. Specifically, the floor 14 includes an entry section 14a, a transition section 14b, and an exit section 14c in continuous successive order along the flow direction F. The entry section 14a provides the extended shallow portion 10a of the tank 10 along with the front end wall 20 and corresponding portions of the roof 12 and the sidewalls 16, 18. The transition section 14b and the exit section 14c likewise provide the deep holding portion 10b of the tank 10 along with the rear end wall 22 and corresponding portions of the roof 12 and sidewalls 16, 18. Each of the extended shallow portion 10a and the deep holding portion 10b defines part of the interior chamber 24. In that regard, an upstream portion 24a of the interior chamber 24 is defined by the extended shallow portion 10a and a downstream portion 24b of the interior chamber 24 is defined by the deep holding portion 10b.

The extended shallow portion 10a of the tank 10 includes an inlet end 34 and an outlet end 36. The inlet end 34 is located adjacent to the front end wall 20. The inlet 26 of the tank 10 communicates with the upstream portion 24a of the interior chamber 24 at the inlet end 34 of the extended shallow portion 10a and, consequently, provides a conduit for the flow 30 of foamy molten glass to enter into the upstream portion 24a of the interior chamber 24. The inlet 26 may be defined in the roof 12, as shown, although it could also be defined in the front end wall 20 or one or both of the sidewalls 16, 18. The outlet end 36 of the extended shallow portion 10a is spaced apart from the inlet end 34 in the flow direction F and communicates directly with the deep holding portion 10b of the tank 10. Within the extended shallow portion 10a, the entry section 14a of the floor 14 has flow surface 38 over which molten glass flows towards the deep holding portion 10b. The flow surface 38 of the entry section 14a is preferably level or slightly downwardly inclined relative to horizontal such that gravity supports the forward flow of molten glass.

The deep holding portion 10b of the tank includes an inlet end 40 and an outlet end 42. The inlet end 40 communicates directly with the outlet end 36 of the extended shallow portion 10a. The outlet end 42 is located adjacent to the rear end wall 22 and is spaced apart from the inlet end 40 in the flow direction F. The outlet 28 of the tank 10 communicates with the downstream portion 24b of the interior chamber 24 at the outlet end 42 of the deep holding portion 10b and, consequently, provides a conduit for the flow 32 of refined molten glass to exit the downstream portion 24b of the interior chamber 24. The outlet 28 may be defined in the rear end wall 22, as shown, although it could also be defined in the floor 14—more specifically, the exit section 14c of the floor 14—or one or both of the sidewalls 16, 18. Within the deep holding portion 10b, the transition section 14b of the floor 14 extends downwardly and outwardly from the entry section 14a of the floor 14 to the exit section 14c of the floor 14. Accordingly, the outlet 28 of the tank 10 is displaced downwardly (i.e., below in the depth dimension D) from the inlet 26 of the tank 10, and a depth d3 of the downstream portion 24b of the interior chamber 24 that is partially defined by the exit section 14c of the floor 14 is greater at the outlet end 42 of the deep holding portion 10b than a depth d1 of the upstream portion 24a of the interior chamber 24 at the outlet end 36 of the extended shallow portion 10a.

The transition section 14b in this particular embodiment includes a flow surface 44 that slopes downwardly and outwardly from the flow surface 38 of the entry section 14a of the floor 14 to a flow surface 46 of the exit section 14c of the floor 14. The flow surface 44 of the transition section 14b slopes downwardly from the flow surface 38 of the entry section 14a of the floor 14 at an angle α that preferably ranges from 30° to 75° or, more narrowly from 45° to 60°, from a horizontal imaginary plane 48 extending from a downstream end of the flow surface 38 of the entry section 14a included in the extended shallow portion 10a. The horizontal imaginary plane 48 is level with respect to gravity. As such, a depth d2 of the downstream portion 24b of the interior chamber 24 progressively increases along the transition section 14b of the floor 14 in the flow direction F. The flow surface 46 of the exit section 14c of the floor 14 extends outwardly from the flow surface 44 of the transition section 14b at an angle β that preferably ranges from 115° to 160° or, more narrowly, from 130° to 145°. The flow surface 46 of the exit section 14c is preferably level or slightly downwardly inclined (e.g, up to 10°) relative to horizontal such that gravity supports the forward flow of molten glass to the outlet end 42 of the deep holding portion 10b of the tank 10. The outlet 28 of the tank 10 is also preferably open to the flow surface 46 of the exit section 14c of the floor 14; that is, the flow surface 46 of the exit section 14c is flush with the outlet 28 such that the flow 32 of refined molten glass is sourced from molten glass that lies along the flow surface 46 of the exit section 14c.

The gradient fining tank 10 is sized so that the interior chamber 24 can hold a steady-state volume of a molten glass bath 50 that provides the residence time needed for the flow 30 of foamy molten glass to be incorporated into and refined within the bath 50 before being discharged as the flow 32 of refined molten glass. The size of the gradient fining tank 10 depends on a number of factors including the flow rate of the flow 30 of foamy molten glass and the residence time needed to attain quality refining. In many instances, the tank 10 is sized so that the interior chamber 24 can hold anywhere between 1 and 50 metric tons of molten glass as the molten glass bath 50 with a surface level 52 of the bath 50 being high enough that the bath 50 partially fills both the upstream and downstream portions 24a, 24b of the interior chamber as shown in FIG. 1. In other words, the molten glass bath 50 is contained in both the extended shallow portion 10a and the deep holding portion 10b of the tank 10 and contacts the front end wall 20, the rear end wall 22, both sidewalls 16, 18, and the floor 14, but not the roof 12. The surface level 52 of the molten glass bath 50 is constant in the upstream and downstream portions 24a, 24b of the interior chamber 24.

In one particular implementation of the gradient fining tank 10, a length l1 of the upstream portion 24a of the interior chamber 24 within the extended shallow portion 10a may range from 0.5 m to 5.0 m and the depth d1 of the upstream portion 24a of the interior chamber 24 may range from 0.2 m to 1.0 m at all points between the inlet end 34 and the outlet end 36 of the extended shallow portion 10a. Additionally, a length l3 of the downstream portion 24b of the interior chamber 24 that is partially defined by the exit section 14c of the floor 14 may range from 1.0 m to 5.0 m and the depth d3 of that same part of the downstream portion 24b may range from 1.0 m to 10.0 m at all points along the exit section 14c of the floor 14. Still further, a length l2 of the downstream portion 24b of the interior chamber 24 that is partially defined by the transition section 14b of the floor 14 may range from 1.0 m to 5.0 m and the depth d2 of that same part of the downstream portion 24b may range from 0.2 m to 10.0 m at all points along the transition section 14bc of the floor 14 with the understanding that this depth d2 progressively increases from the depth d1 of the upstream portion 24a of the interior chamber 24 at the outlet 36 of the extended shallow portion 10a and the depth d3 of the downstream portion 24b defined partially by the exit section 14c of the floor 14 at the intersection of the transition and exit sections 14b, 14c of the floor 14.

Each of the roof 12, the floor 14, the two laterally-spaced sidewalls 16, 18, the front end wall 20, and the rear end wall 22 may be constructed from a material that can adequately withstand the high temperature and corrosive nature of molten glass such as, for example, a refractory material. A refractory material is a chemically resistant material that has a high melting temperature among other relevant properties including a low thermal conductivity and thermal shock resistance. A wide variety of refractory materials may be employed to construct the structural walls 12, 14, 16, 18, 20, 22 of the gradient fining tank 10. Refractory oxide materials including zirconia, fused cast alumina-zirconia-silica (AZS), and alumina-silica are several specific refractories that may be used in the construction of the tank 10, although they are certainly not the only viable candidates, as certain refractory metals or refractory metal alloys, such as nickel alloys, could also be used in the construction of the tank 10. In some instances, the floor 14 and the portions of the sidewalls 16, 18 and end walls 20, 22 that are exposed to molten glass may be constructed from one type of refractory material, while the roof 12 and the portions of the sidewalls 16, 18 and end walls 20, 22 that are not exposed to molten glass may be constructed from another type of refractory material.

The gradient fining tank 10 may optionally include various types of augmentation equipment to improve the refining capability of the tank 10, although such equipment is not necessarily required in order to attain quality refined glass within the tank 10. For instance, the tank 10 may include one or more skimmers 54 that extend downwardly from the roof 12 into the molten glass bath 50 and laterally between the sidewalls 16, 18. In one particular embodiment, as shown here in FIG. 1, a skimmer 54a may extend downwardly from the roof 12 so that a free end 56 of the skimmer 54a is submerged into the molten glass bath 50 within the deep holding portion 10b of the tank 10 above the transition section 14b of the floor 14. In this way, the free end 56 of the skimmer 54a cooperates with the transition section 14b of the floor 14 and the adjoining portions of the sidewalls 16, 18 to define a restricted passage 58 that impedes the admittance of low density molten glass into the deep holding portion 10b downstream of the skimmer 54a in the flow direction F. Additional skimmers may be located upstream or downstream of the skimmer 54a shown here in FIG. 1.

The gradient fining tank 10 may also include one or more heating devices 60 that transfer heat to the molten glass bath 50 either alone or in combination with the one or more skimmers 54. If present, the one or more heating devices 60 may include one or more impingement burners 60a mounted in the roof 12, the front end wall 20, and/or in one or both of the sidewalls 16, 18 above the surface level 52 of the molten glass bath 50 of the tank 10 at least within the extended shallow portion 10a. These burners 60a burn a mixture of fuel and oxidant and direct the resultant flames 62 downward into contact with the surface level 52 of the molten glass bath 50 in the tank 10. By impinging the surface of the molten glass bath 50 with the emitted flames 62, the stable layer of bubbles that tends to form on the surface of the bath 50 as part of a lower-density molten glass phase of the bath 50 can be disrupted to allow gas bubbles to continue to burst and escape from the molten glass bath 50. One or more exhaust ducts 53 may communicate with the space above the molten glass bath 50 through the roof 12, sidewalls 16, 18, and/or end walls 20, 22 to remove combustion products emitted from the impingement burners 60a or any other gaseous products that may need to be vented from the gradient fining tank 10. If more than one exhaust duct 53 is present, the several exhaust ducts 53 may vent to a common exhaust manifold 55, if desired.

Additionally, and as shown here, the tank 10 may further include one or more non-impingement burners 60b mounted in the roof 12, the rear end wall 22, and/or in one or both of the sidewalls 16, 18 above the surface level 52 of the molten glass bath 50 at least within the deep holding portion 10b of the tank 10. The one or more non-impingement burners 60b burn a mixture of fuel and oxidant, although the flames 64 produced do not impinge the molten glass bath 50. Rather, the burners 60b transfer heat to the molten glass bath 50 by radiation from the space above the molten glass bath 50 to facilitate a faster rate of refining since gaseous inclusions are more readily liberated as the temperature of molten glass increases and its viscosity decreases. If the skimmer 54a is included in the structure of the tank 10, the impingement burners 60a are preferably located upstream of the skimmer 54a, and the non-impingement burners 60b are preferably located downstream of the skimmer 54a. Still further, the tank 10 may include electric heaters 60c installed within the floor 14 of the tank 10, if desired, in either or both of the extended shallow portion 10a and the deep holding portion 10b of the tank 10.

Figure 4:
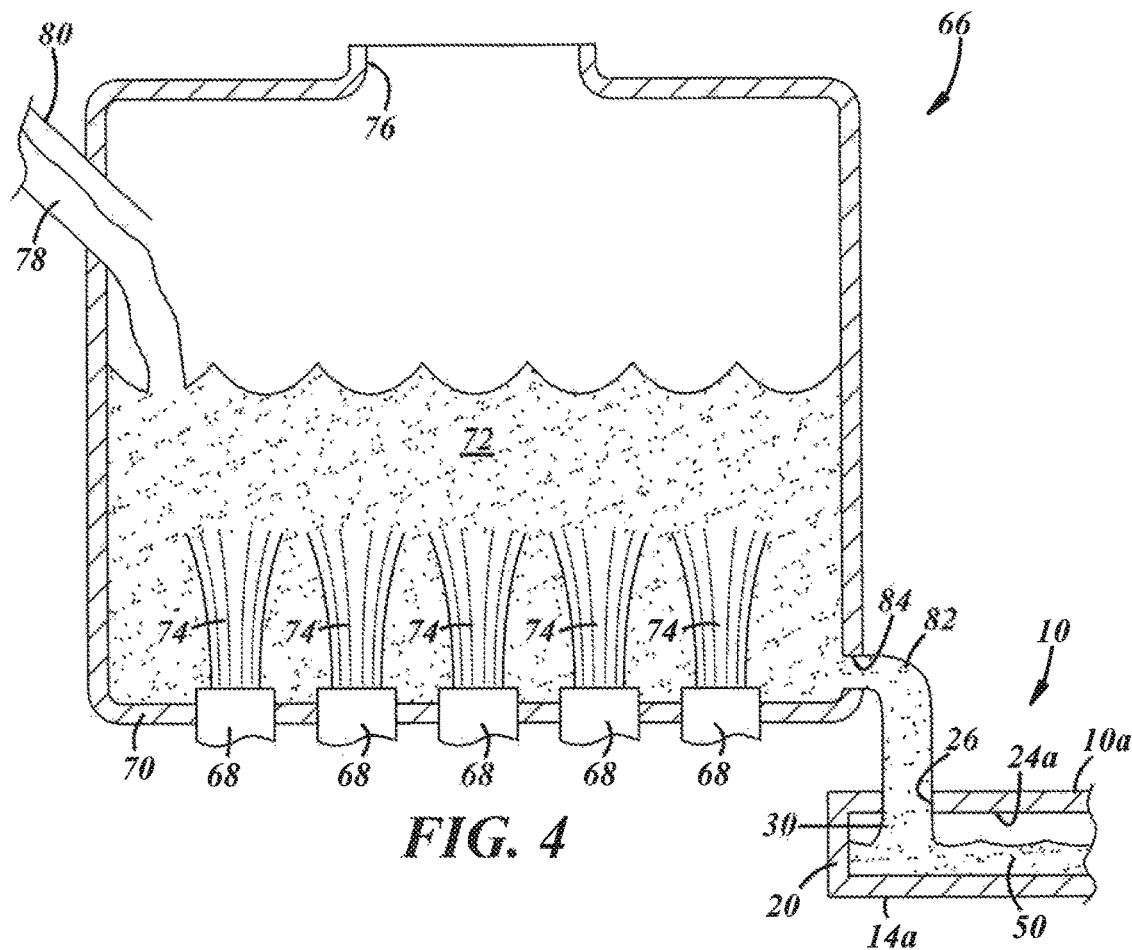
FIG. 4 is an elevated perspective view of a gradient fining tank according to various embodiments along with a submerged combustion melter that is producing foamy molten glass for delivery to the gradient fining tank.

Referring now to FIG. 4, the gradient fining tank 10 is preferably used to refine foamy molten glass produced by a submerged combustion (SC) melter 66. The SC melter 66 includes submerged burners 68—typically of the oxy-fuel type located in a floor 70 of the melter 66—that individually discharge a mixture of fuel and oxidant that autoignites within a turbulent bath 72 of molten glass to cause vigorous agitation within the bath 72 as the combustion gasses 74 are thrust through the bath 72. These combustion gasses 74 eventually escape the molten glass bath 72 and are removed from the SC melter 66 through an exhaust duct 76. In operation, a glass feedstock 78 is fed into the SC melter 66 and onto the molten glass bath 72 through a feeder 80. The vigorous stirring caused by the submerged burners 68 creates intense heat transfer and rapid particle dissolution throughout the bath 72. This enables the glass feedstock 78 to mix, react, and become chemically integrated into the molten glass bath 72 relatively quickly. A flow 82 of foamy molten glass is directed from the molten glass bath 72 contained in the SC melter 66 through a discharge conduit 84 located at the end of the SC melter 66 where the molten glass is most chemically homogenized. The molten glass in the outlet flow 82 is foamy in that it contains a homogeneous distribution of entrained bubbles and has a density that usually ranges from 0.99 $gm/cm^3$ to 1.3 $gm/cm^3$. The foamy nature of this flow 82 of molten glass is attributable to the agitation and stirring of the molten glass bath 72 induced by the submerged burners 68. Typically, the gaseous inclusions entrained within the molten glass bath 72 vary in size and contain any of several gasses including $CO$, $CO_2$, $H_2O$ (vapor), $SO_2$, $CH_4$, and volatile organic compounds (VOCs).

The glass feedstock 78 charged into the SC melter 66 is a material or a mixture of materials from which the final glass chemistry can be obtained upon melting. For example, if soda-lime-silica glass is being made, the glass feedstock 78 may be a physical mixture of virgin raw materials and cullet (i.e., recycled glass) that provides a source of $SiO_2$, $Na_2O$, and $CaO$ in the correct proportions. The virgin raw materials may include corresponding quantities of quartz sand (i.e., crystalline $SiO_2$), soda ash, and limestone as the source of $SiO_2$, $Na_2O$, and $CaO$, respectively. Other virgin raw materials may also be included in the glass feedstock 78 to provide a source of one or more of $SiO_2$, $Na_2O$, $CaO$ and possibly other oxide and/or non-oxide materials depending on the chemistry of the soda-lime-silica glass being produced. These other virgin raw materials may include feldspar, dolomite, and calumite slag. Additionally, the glass feedstock 78 may include virgin raw materials that provide any of the network formers, network modifiers, colorants, decolorants, redox agents, or other agents listed above as well one or more fining agents. The glass feedstock 78 may include up to 80 wt % cullet—with the remainder typically being entirely or mostly virgin raw materials—depending on a variety of factors including the characteristics (color, transparency, etc.) of the soda-lime-glass being manufactured. Other materials such as the glass precursor gel described in US2016/0289114A1 may be included in the glass feedstock 78 in addition to virgin raw materials and, if present, any cullet, and in some instances may even be used exclusively as the glass feedstock 78.

The flow 82 of foamy molten glass that exits the SC melter 66 through the discharge conduit 84 needs to be refined so that a finished glass article, such as a glass container, produced from the molten glass is free of visual commercial variations. Glass refining is the process in which gaseous inclusions such as bubbles and seeds are removed from the molten glass. The resultant refined molten glass need not be perfectly free of gaseous inclusions to be commercially acceptable. In many instances, for example, refined molten glass can achieve a density that ranges from 2.3 gm/cm$^3$ to 2.5 gm/cm$^3$. The glass refining process here is more complex and challenging compared to the refining of molten glass that is produced in a conventional melting furnace that does not employ submerged burners. This is because the flow 82 of foamy molten glass includes a greater quantity of homogeneously distributed gaseous inclusions than the molten glass produced in a conventional furnace due to the severe fluid disturbances caused by the submerged burners 68. The gradient fining tank 10 is designed to refine this type of foamy molten glass efficiently.

Glass refining using the gradient fining tank 10 involves, first, introducing the flow 30 of foamy molten glass into the interior tank chamber 24 through the inlet 26 of the tank 10. The flow 30 of foamy molten glass may be all or part of the flow 82 of foamy molten glass that is discharged from the SC melter 66, or it may be a flow of foamy molten glass that is indirectly derived from the flow 82 of foamy molten glass that is discharged from the SC melter 66 such as, for example, when the a stilling tank or holding tank is fluidly positioned between the SC melter 66 and the fining tank 10. In one particular embodiment, as shown generally in FIG. 4, the flow 82 of foamy molten glass discharged from the SC melter 66 is introduced directly into the interior chamber 24 of the gradient fining tank 10 through the inlet 26 as the flow 30 of foamy molten glass. The flow 30 of foamy molten glass may fall from the discharge conduit 84 of the SC melter 66 under the force of gravity through the inlet 26 of the gradient fining tank 10, as shown, or it may enter the interior chamber 24 in another way. Once introduced into the interior tank chamber 24 of the tank 10, the flow 30 of foamy molten glass intermixes with, and is subsumed by, the molten glass bath 50 contained within the interior chamber 24 and, more specifically, within the upstream portion 24a of the interior chamber 24 defined by the extended shallow portion 10a of the tank 10.

The molten glass bath 50 maintained within the interior chamber 24 flows from the inlet 26 of the tank 10, which communicates with the upstream portion 24a of the interior chamber defined by the extended shallow portion 10a, to the outlet 28 of the tank 10, which communicates with the downstream portion 24b of the interior chamber 24 defined by the deep holding portion 10b, along the flow direction F. The surface level 52 of the molten glass bath 50 generally remains constant despite this movement as the flow 32 of refined molten glass that is discharged from the interior chamber 24 through the outlet 28 of the tank 10 offsets the flow 30 of foamy molten glass being introduced into the interior chamber 24. Consequently, as the flow 30 of foamy molten glass is introduced into the interior chamber 24 through the inlet 26, the molten glass bath 50 flows along the flow surface 38 of the entry section 14a of the floor 14 from the inlet end 34 to the outlet end 36 of the extended shallow portion 10a. During the time the molten glass bath 50 is flowing through the extended shallow portion 10a, the molten glass achieves a density differential as the gaseous inclusions contained within the molten glass begin to rise. Usually, in the extended shallow portion 10a of the tank 10, the molten glass bath 50 separates into a lower-density phase 86 and a higher-density phase 88. The lower-density phase 86 of the molten glass bath 50 rests on top of the higher-density phase 88 and has a higher concentration of gaseous inclusions than the higher-density phase 88. Typically, the lower-density phase 86 has a density that ranges from 0.7 gm/cm$^3$ to 1.0 g/cm$^3$ while the higher-density phase 88 has a density that ranges from above 1.0 g/cm$^3$ to 1.5 g/cm$^3$.

The molten glass bath 50 continues to flow from the upstream portion 24a of the interior chamber 24 defined by the extended shallow portion 10a into the downstream portion 24b of the interior chamber 24 defined by the deep holding portion 10b. More specifically, the molten glass bath 50 flows directly into the inlet end 40 of the deep holding portion 10b from the outlet end 36 of the extended shallow portion 10a. The downward and outward extension of the transition section 14b of the floor 14, and thus the increasing depth of the downstream portion 24b of the interior chamber 24, enables the heavier and denser molten glass of the higher-density phase 88 to sink and flow over the flow surface 44 of the transition section 14b and eventually over the flow surface 46 of the exit section 14c of the floor 14 within the deep holding portion 10b of the tank 10 in the flow direction F. The lower-density phase 86 of the molten glass bath 50 either stays near the top of the bath 50 in the deep holding portion 10b or, if the skimmer 54a is present, is blocked from flowing further downstream of the skimmer 54a as only the higher-density phase 88 of the bath 50 is permitted to pass through the restricted passage 58.

The density of the molten glass bath 50 thus increases along the floor 14 of the tank 10 in the flow direction F as well as from the surface level 52 of the bath 50 towards the floor 14 of the tank 10. This density profile is represented in a general manner by arrows D. Compared to a tank that has a constant depth along its length, the density of the molten glass bath 50 increases more rapidly along the floor 14 of the gradient fining tank 10 in the flow direction F, mainly because of the change in depth of the tank 10 engendered by the transition section 14b of the floor 14, which means that the residence time needed to satisfactorily refine the foamy molten glass introduced into the tank 10 is shortened.

As a result of the profile of the floor 14 of the tank 10 and the flow of the molten glass bath 50, the density of the molten glass bath 50 is greatest, and the concentration of entrained gaseous inclusions is lowest, within the downstream portion 24b of the interior chamber 24 at the outlet end 42 of the deep holding portion 10b of the tank 10. To that end, a zone 90 of refined molten glass collects within the molten glass bath 50 adjacent to the outlet end 42 of the deep holding portion 10b and in fluid communication with the outlet 28 of the tank 10. The flow 32 of refined molten glass that is discharged from the gradient fining tank 10 is supplied by the zone 90 of refined molten glass continuously. The flow 32 of refined molten glass, which has attained a level of chemical and thermal homogeneity along with being adequately free of gaseous inclusions, may then be transported away from the tank 10 for further processing. For instance, in the manufacture of glass containers, the flow 32 of refined molten glass may be directed through a forehearth to a glass feeder. The forehearth is an extended channel that functions to cool refined molten glass at a controlled rate to a temperature and viscosity suitable for glass forming operations while also achieving a more uniform temperature profile within the molten glass. The glass feeder distributes runners of the molten glass to a shearing mechanism that shears the runners into glass gobs, which subsequently fall into a gob distribution system and are routed to blank molds of individual sections of an individual section forming machine.

Figure 2:
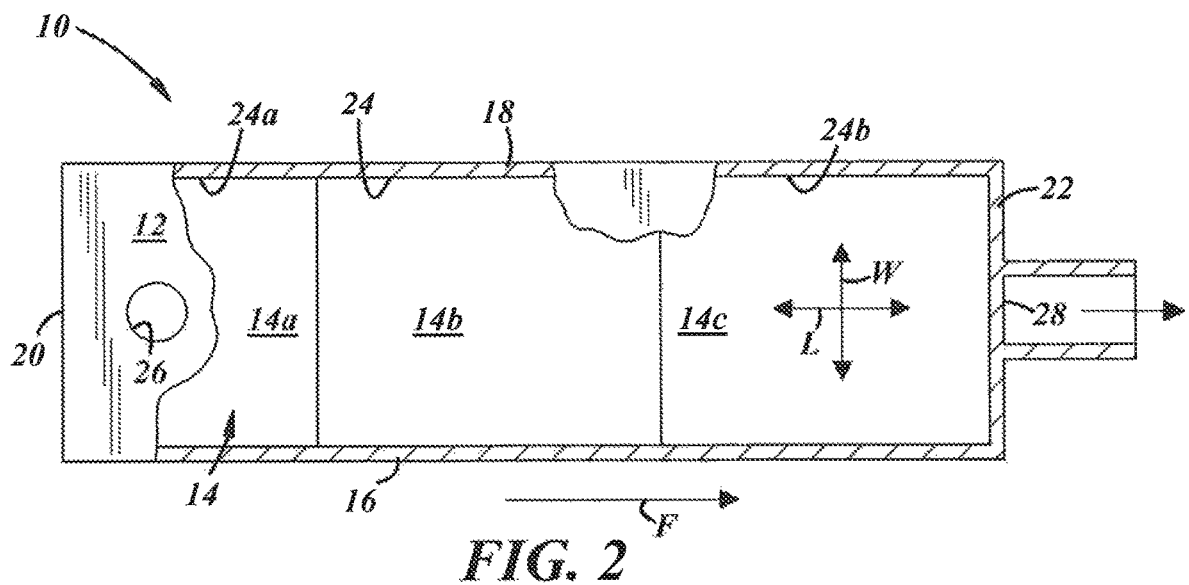
FIG. 2 is a plan view of the gradient fining tank illustrated in FIG. 1.
Figure 3:
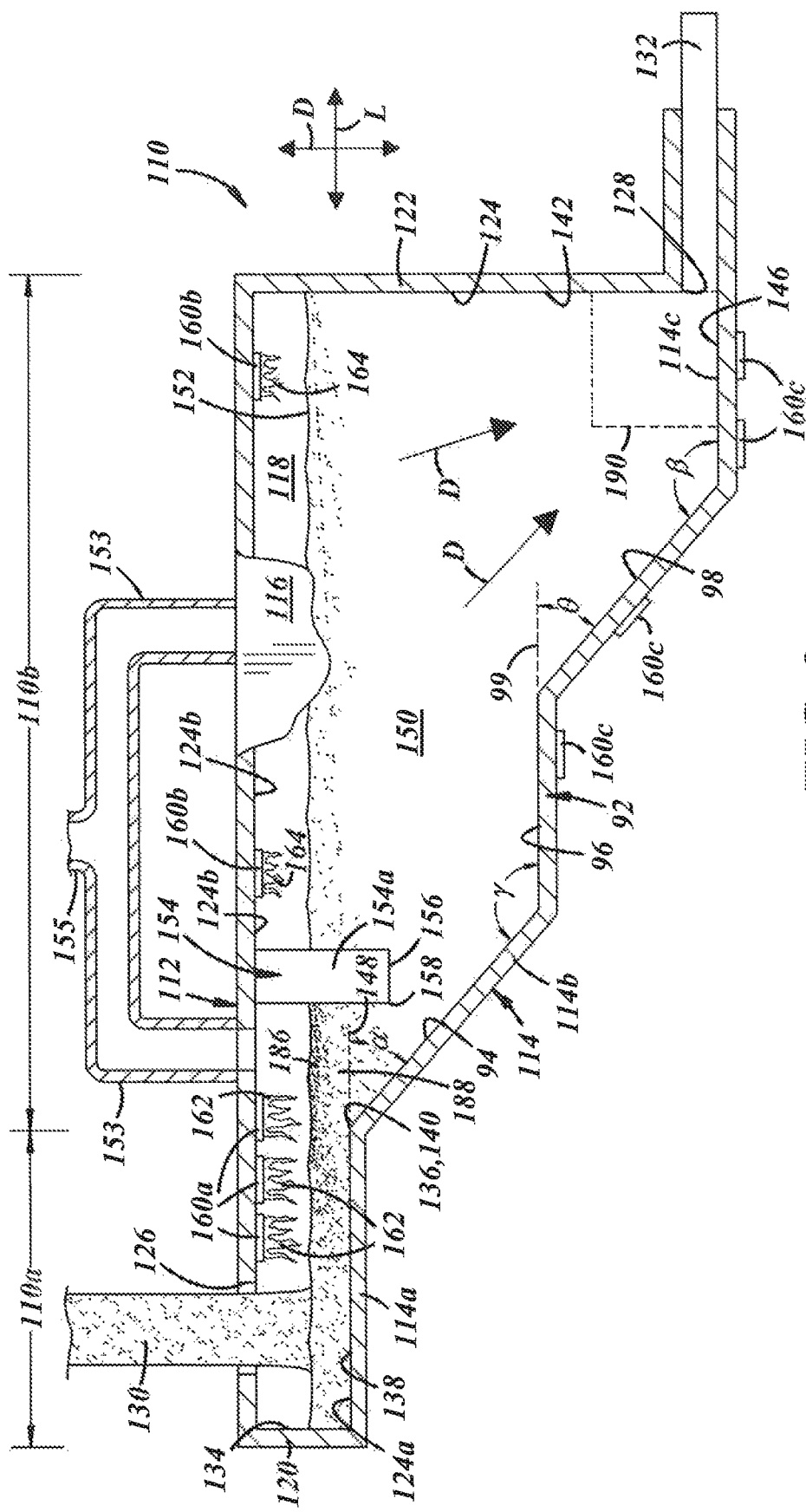
FIG. 3 is an elevated partial cross-sectional view of a gradient fining tank according to another embodiment of the present disclosure.

The gradient fining tank 10 shown in FIGS. 1-2 and described specifically above is subject to a variety of structural variations without necessarily compromising the goal of efficiently refining foamy molten glass. Referring now to FIG. 3, for example, a second embodiment of the disclosed gradient fining tank is identified by reference numeral 110. In this embodiment, reference numerals that correspond to the previously-described gradient fining tank 10 are used to designate corresponding structural features. As such, the use of a corresponding 100 series reference numeral in connection with the gradient fining tank 110 shown in FIG. 3 incorporates the earlier discussion of that same feature in the gradient fining tank 10 shown in FIGS. 1-2 as if fully reiterated here along with any additional modifying disclosure. The following discussion of the gradient fining tank 110 is therefore limited to the material difference(s) relative to the previously-described gradient fining tank 10 with the understanding that the rest of the tank 110 is the same as before.

The gradient fining tank 110 shown here in FIG. 3 is essentially the same as the previously-described gradient fining tank 10 except for the construction of the transition section 114b of the floor 114. As shown, the transition section 114b of the floor 114 still extends downwardly and outwardly from the entry section 114a of the floor 114 to the exit section 114c of the floor 114. But rather than having a flow surface that slopes downwardly from the flow surface 138 of the entry section 114a to the flow surface 146 of the exit section 114c, the transition section 114b of the floor 114 in this embodiment includes a step 92. In particular, the transition section 114b includes an upper flow surface 94 that slopes downwardly at the angle α (e.g., from 30° to 75° or, more narrowly, from 45° to 60°) from the horizontal imaginary plane 148 extending from a downstream end of the flow surface 138 of the entry section 114a included in the extended shallow portion 110, as before, and further includes an intermediate step flow surface 96 and a lower flow surface 98. The intermediate step flow surface 96 extends outwardly from the upper flow surface 94 at an angle γ that that preferably ranges from 115° to 160° or, more narrowly, from 130° to 145°, and the lower flow surface 98 slopes downwardly at an angle θ that preferably ranges from 30° to 75° or, more narrowly from 45° to 60°, from a horizontal imaginary plane 99 extending from a downstream end of the intermediate step flow surface 96 to the flow surface 146 of the exit section 114c of the floor 114. Like the horizontal imaginary plane 148, the horizontal imaginary plane 99 is level with respect to gravity. The angle β shown here is the same as before. In this way, the depth d2 of the downstream portion 124b of the interior chamber 124 increases unevenly along the transition section 114b of the floor 114 in the flow direction F.

The transition section 114b of the floor 114 in this embodiment directs the flow of the heavier and denser molten glass in the higher-density phase 188 of the molten glass bath 150 toward the outlet end 142 of the deep holding portion 110b along a slightly different course compared to the previously-described gradient fining tank 10. The higher-density phase 188 may assume a rippling current as it flows down along the flow surfaces 94, 96, 98 of the transition section 114b of the floor 114 up and over the step 92. Despite the change in flow behavior, the heavier and denser molten glass of the higher-density phase 188 still sinks and flows over the flow surfaces 94, 96, 98 of the transition section 114b and eventually over the flow surface 146 of the exit section 114c of the floor 114 within the deep holding portion 110b of the tank 110 in the flow direction F. In that regard, and similar to the previous embodiment, the density of the molten glass bath 150 increases along the floor 114 of the tank 110 in the flow direction F as well as from the surface level 152 of the bath 150 towards the floor 114 of the tank 110, as is represented again in a general manner by arrows D.

There thus has been disclosed a gradient fining tank and a method of refining foamy molten glass within the tank that satisfies one or more of the objects and aims previously set forth. The foamy molten glass may be produced in an upstream melter and then provided either directly or indirectly to the gradient fining tank. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of refining foamy molten glass, the method comprising:
    introducing foamy molten glass into an interior chamber of a gradient fining tank defined at least in part by a roof, a floor, and a pair of laterally-spaced sidewalls that connect the roof and the floor, the foamy molten glass being introduced into the interior chamber through an inlet of the gradient fining tank that communicates with an upstream portion of the interior chamber defined by an extended shallow portion of the tank, and, wherein, upon introduction into the upstream portion of the interior chamber, the foamy molten glass intermixes with a molten glass bath that is maintained within the interior chamber of the gradient fining tank;
    directing the molten glass bath to flow along the extended shallow portion of the gradient fining tank from an inlet end of the extended shallow portion to an outlet end of the extended shallow portion, the extended shallow portion including an entry section of the floor, and the molten glass bath separating into a higher-density phase and a lower-density phase that rests on top of the higher-density phase within the extended shallow portion of the gradient fining tank;
    directing the molten glass bath to flow into a downstream portion of the interior chamber defined by a deep holding portion of the gradient fining tank, the deep holding portion having an inlet end, which communicates with the outlet end of the extended shallow portion, and an outlet end, the deep holding portion further including a transition section of the floor that extends downwardly and outwardly from the entry section of the floor of the extended shallow portion to an exit section of the floor such that a depth of the downstream portion of the interior chamber at the outlet end of the deep holding portion is greater than a depth of the upstream portion of the interior chamber at the outlet end of the extended shallow portion;
    directing the molten glass bath to flow along the deep holding portion from the inlet end of the deep holding portion to the outlet end of the deep holding portion, the higher-density phase of the molten glass bath sinking and collecting as refined molten glass within the downstream portion of the interior chamber above the exit section of the floor at the outlet end of the deep holding portion of the tank; and removing refined molten glass from the interior chamber of the gradient fining tank through an outlet of the gradient fining tank that communicates with the downstream portion of the interior chamber, the outlet of the gradient fining tank being downwardly displaced from the inlet of the gradient fining tank.

2. The method set forth in claim 1, wherein the higher-density phase of the molten glass bath has a density that ranges from above 1.0 gm/cm$^3$ to 1.5 gm/cm$^3$ and the lower-density phase of the molten glass bath has a density that ranges from 0.7 gm/cm$^3$ to 1.0 gm/cm$^3$, within the extended shallow portion of the gradient fining tank.

3. The method set forth in claim 1, wherein the entry section of the floor has a flow surface, and the transition section of the floor has a flow surface that slopes downwardly from the flow surface of the entry section of the floor at an angle that ranges from 30° to 75° from a horizontal imaginary plane extending from a downstream end of the flow surface of the entry section.

4. The method set forth in claim 3, wherein the flow surface of the transition section slopes downwardly to a flow surface of the exit section such that a depth of the downstream portion of the interior chamber progressively increases along the transition section, and wherein the flow surface of the exit section of the floor extends outwardly from the flow surface of the transition section of the floor at an angle that ranges from 115° to 160°.

5. The method set forth in claim 3, wherein the flow surface of the transition section of the floor is an upper flow surface that slopes downwardly to an intermediate step flow surface of the transition section, the intermediate step flow surface extending outwardly from the upper flow surface at an angle that ranges from 115° to 160°, and wherein the transition section further includes a lower flow surface that slopes downwardly from the intermediate step flow surface at an angle that ranges from 30° to 75° from a horizontal imaginary plane extending from a downstream end of the intermediate step flow surface.

6. The method set forth in claim 5, wherein the lower flow surface of the transition section of the floor slopes downwardly to a flow surface of the exit section of the floor, and wherein the flow surface of the exit section of the floor extends outwardly from the lower flow surface of the transition section of the floor at an angle that ranges from 115° to 160°.

7. The method set forth in claim 1, wherein the exit section of the floor has a flow surface, and the outlet of the gradient fining tank is open to the flow surface of the exit section.

8. The method set forth in claim 1, wherein the depth of the upstream portion of the interior chamber at the outlet end of the extended shallow portion of the gradient fining tank ranges from 0.2 m to 1.0 m, and wherein the depth of the downstream portion of the interior chamber at the outlet end of the deep holding portion of the gradient fining tank ranges from 1.0 m to 10 m.

9. The method set forth in claim 1, wherein the foamy molten glass that is introduced into the gradient fining tank has a density that ranges from 0.9 gm/cm$^3$ to 1.3 gm/cm$^3$, and wherein the refined molten glass that is removed from the gradient fining tank has a density that ranges from 2.3 gm/cm$^3$ to 2.5 gm/cm$^3$.

10. The method set forth in claim 1, wherein one or more skimmers extend downwardly from the roof of the gradient fining tank and are submerged into the molten glass bath.

11. The method set forth in claim 10, wherein the one or more skimmers includes a skimmer that extends downwardly from the roof of the gradient fining tank so that a free end of the skimmer is submerged into the molten glass bath above the transition section of the floor, the free end of the skimmer cooperating with the transition section of the floor and the sidewalls to define a restricted passage that impedes the admittance of the lower-density phase of the molten glass bath downstream of the skimmer.

12. The method set forth in claim 1, wherein the gradient fining tank includes one or more heating devices that transfer heat to the molten glass bath.

13. The method set forth in claim 12, wherein the one or more heating devices includes one or more impingement burners mounted in the roof of the gradient fining tank within the extended shallow portion of the tank, the one or more impingement burners directing flames downwardly into contact with a top surface of the molten glass bath.

14. The method set forth in claim 12, wherein the one or more heating devices includes one or more impingement burners mounted in one or both of the sidewalls above the molten glass bath within the extended shallow portion of the tank, the one or more impingement burners directing flames downwardly into contact with a top surface of the molten glass bath.

15. A method of refining foamy molten glass, the method comprising:

providing a gradient fining tank that includes a roof, a floor, and a pair of sidewalls that connect the roof and the floor, the roof, the floor, and the sidewalls at least partially defining an interior chamber that holds a molten glass bath, the gradient fining tank having an extended shallow portion that defines an upstream portion of the interior chamber and a deep holding portion that defines a downstream portion of the interior chamber, wherein the extended shallow portion of the tank includes an entry section of the floor and the downstream portion of the tank includes a transition section of the floor that extends downwardly and outwardly from the entry section of the floor to an exit section of the floor such that a depth of the downstream portion of the interior chamber at an outlet end of the deep holding portion is greater than a depth of the upstream portion of the interior chamber at an outlet end of the extended shallow portion;

introducing foamy molten glass into the upstream portion of the interior chamber through an inlet of the gradient fining tank, the foamy molten glass being received from a submerged combustion melter and intermixing with the molten glass bath that is maintained within the interior chamber of the gradient fining tank;

directing the molten glass bath to flow along the extended shallow portion and into and along the deep holding portion in a flow direction through the interior chamber, the molten glass bath flowing through a restricted passage defined by the transition section of the floor, the sidewalls, and a free end of a skimmer that extends downwardly from the roof of the gradient fining tank into the molten glass bath from above the transition section of the floor, the molten glass bath having a zone of refined molten glass that collects adjacent to the outlet end of the deep holding portion above the exit section of the floor of the gradient fining tank; and removing refined molten glass from the downstream portion of the interior chamber through an outlet of the gradient fining tank, the outlet of the gradient fining tank being downwardly displaced from the inlet of the gradient fining tank and open to a flow surface of the exit section of the floor.

16. The method set forth in claim 15, further comprising introducing heat to the molten glass bath from one or more heating devices selected from the group consisting of impingement burners, non-impingement burners, and electric heaters.

17. The method set forth in claim 15, wherein the entry section of the floor has a flow surface, and the transition section of the floor has a flow surface that slopes downwardly from the flow surface of the entry section of the floor at an angle that ranges from 30° to 75° from a horizontal imaginary plane extending from a downstream end of the flow surface of the entry section, the flow surface of the transition section of the floor sloping downwardly to a flow surface of the exit section of the floor such that a depth of the downstream portion of the interior chamber progressively increases along the transition section, and wherein the flow surface of the exit section of the floor extends outwardly from the flow surface of the transition section of the floor at an angle that ranges from 115° to 160°.

18. The method set forth in claim 15, wherein the entry section of the floor has a flow surface, and the transition section of the floor has an upper flow surface that slopes downwardly from the flow surface of the entry section of the floor at an angle that ranges from 30° to 75° from a horizontal imaginary plane extending from a downstream end of the flow surface of the entry section, the transition section of the floor further including an intermediate step flow surface that extends outwardly from the upper flow surface at an angle that ranges from 115° to 160°, and a lower flow surface that slopes downwardly from the intermediate step flow surface at an angle that ranges from 30° to 75° from a horizontal imaginary plane extending from a downstream end of the intermediate step flow surface, the lower flow surface of the transition section of the floor sloping downwardly to a flow surface of the exit section of the floor, the flow surface of the exit section of the floor extending outwardly from the lower flow surface of the transition section of the floor at an angle that ranges from 115° to 160°.

* * * * *